United States Patent [19]

Ohsawa

[11] 3,784,934

[45] Jan. 8, 1974

[54] ALL-PASS PHASE-SHIFT CIRCUIT

[75] Inventor: Mitsuo Ohsawa, Kanagawa-ken, Japan

[73] Assignee: Sony Corporation, Tokyo, Japan

[22] Filed: Nov. 10, 1972

[21] Appl. No.: 305,530

[30] Foreign Application Priority Data

Nov. 19, 1971 Japan .............................. 46/92800

[52] U.S. Cl. .................................... 333/29, 333/23

[51] Int. Cl. ............................................ H03h 7/30

[58] Field of Search .................. 333/29, 70 CR, 74, 333/75; 323/122, 123, 126

[56] References Cited

UNITED STATES PATENTS 3,246,241 4/1966 Colby, Jr. .......................... 323/122

*Primary Examiner*—Rudolph V. Rolinec
*Assistant Examiner*—Marvin Nussbaum
*Attorney*—Lewis H. Eslinger et al.

[57] ABSTRACT

An all-pass phase-shift circuit having an input circuit for supplying signals with reversed phases at first and second terminals, and a phase-shifter bridge circuit with a first capacitor connected in series with a first resistor between the first and second terminals, a second resistor connected in series between the first capacitor and the first resistor, a series connection of a third resistor and a second capacitor connected in parallel with the first resistor, a third capacitor and means for connecting the third capacitor in parallel with the second resistor. A signal applied to the input circuit of the phase-shift circuit is linearly phase-shifted with respect to frequency.

8 Claims, 23 Drawing Figures

ALL-PASS PHASE-SHIFT CIRCUIT

BACKGROUND OF THE INVENTION

The present invention relates to an all-pass phase-shift circuit and more particularly to an all-pass phase-shift circuit which is suitable for production as an integrated circuit.

In four-channel stereo reproducing apparatus of the type employing a matrix system, an audio signal is divided into, for example, two signals *Sa* and *Sb* and a predetermined phase difference, for example, a phase difference of 90° is required between the signals *Sa* and *Sb* over almost all of their frequency band (for example, 30 Hz ≈ 20 KHz).

However, in practice, it is impossible to keep one of the signals *Sa* and *Sb* as it is and shift the other signal only by 90° over all of its frequency band, so that, in general, both the signals *Sa* and *Sb* are applied to a phase shift circuit and a phase difference of 90° is produced between signals derived from the phase-shift circuit.

In a typical prior art phase-shift circuit, as shown in FIG. 1 there is provided a transistor *Qa* between the collector and emitter electrodes of which a series circuit of a capacitor *Ca* and a resistor *Ra* is inserted. An input terminal 1 is connected to the base electrode of the transistor *Qa* while an output terminal 2 is led out from the connection point between the capacitor *Ca* and the resistor *Ra*. With the phase-shift circuit shown in FIG. 1 a signal applied to the input terminal 1 is derived from the output terminal 2 with a predetermined frequency characteristic according to the capacitance and resistance values of the capacitor *Ca* and the resistor *Ra*. However, a phase-shift characteristic with linearity over a wide range of frequency is not attained.

In order to avoid the drawback of the circuit shown in FIG. 1, a phase-shift circuit has been proposed as shown in FIG. 2 in which four circuits, each of which is the same as that shown in FIG. 1, are connected in cascade. In this case, there are provided four transistors *Qa*, *Qb*, *Qc* and *Qd* and series connections of capacitors *Ca*, *Cb*, *Cc* and *Cd* and resistors of *Ra*, *Rb*, *Rc* and *Rd* are connected between the collector and emitter electrodes of the respective transistors *Qa*, *Qb*, *Qc* and *Qd*. A last stage transistor *Qe* in FIG. 2 is for the purpose impedance conversion and an output terminal is led out from its emitter electrode.

The circuit shown in FIG. 2, however, has the following drawback. Since the capacitors *Ca* to *Cd* and the resistors *Ra* to *Rd* determine the phase characteristic of the circuit, it is required that each of the capacitors and resistors must be made with high accuracy and the capacitors *Ca* to *Cd* must be made with a high capacitance value due to the fact that the input signal for the circuit is at a relatively low or audible frequency. For this reason, in the case where the phase-shift circuit shown in FIG. 2 is integrated on a single semiconductor layer or substrate as an integrated circuit (IC) chip, it is rather difficult to form the capacitors *Ca* to *Cd* and the resistors *Ra* to *Rd* on the semiconductor substrate. Accordingly, such elements are independently connected to the substrate from the outside. When the circuit shown in FIG. 2 is formed as an integrated circuit (IC), the number of necessary external terminals is 16 to 17. As a result, the advantages of an IC are deteriorated if the circuit shown in FIG. 2 is formed as an IC chip.

A further all-pass phase-shift circuit has been disclosed in the paper "RC All-pass," Proc. IEEE (letters), pp. 1752–1753, October 1967 by P. Allemandoue. According to the circuit disclosed in the paper of P. Allemandoue, a phase-shift circuit of a single transistor and a plurality of capacitors and resistors connected between the collector and emitter electrodes of the transistor and the impedances thereof are suitably selected. The phase-shift circuit disclosed in this paper has a linear phase-shift characteristic but also has the drawback that its gain characteristic is difficult to be compensated for at a certain frequency with the result that an amplitude variation is caused. The amplitude variation reaults in an undesirable level variation of the output signal.

SUMMARY OF THE INVENTION

The above and other disadvantages are overcome by the present invention of an all-pass phase-shift circuit comprising an input circuit having a first terminal and a common terminal for receiving an input signal and second and third terminals which are separately supplied by the input circuit with signals corresponding to the input signal but which are reversed in phase with respect to each other, a first RC network having at least a first capacitor and a first resistor connected in series between the second and third terminals of the input circuit, a second resistor connected in series between the first capacitor and the first resistor, a series connection of a second capacitor and a third resistor connected in parallel with the first resistor, and a third capacitor connected in parallel with the second resistor. An output is obtained between the junction of the first and second resistors and the common terminal. In some embodiments an output circuit having forth, fifth and sixth terminals has its fourth terminal connected to the connection point between the third capacitor and the third resistor. A parallel circuit including a capacitor and a resistor is connected between the fourth terminal of the output circuit and the circuit ground. Separate phase-shifted output signals are derived from between the fifth and sixth terminals of the output circuit and the circuit ground. In some of the preferred embodiments the input circuit includes an input transistor whose base, emitter and collector electrodes are connected to the first, second and third terminals, respectively, and the output circuit includes a first output transistor whose base, emitter and collector electrodes are connected to the fourth, fifth and sixth terminals, respectively. An output load is connected to at least one of the collector and emitter electrodes of the first output transistor.

One preferred embodiment further includes a second output transistor having base, collector and emitter electrodes, a second RC network connected between the input transistor and the second output transistor and including a fifth capacitor and a fifth resistor connected in series between the collector and emitter electrodes of the input transistor, a sixth resistor connected in series between the fifth capacitor and a fifth resistor, a series connection of a seventh resistor and a sixth capacitor connected in parallel with the fifth resistor, a seventh capacitor connected in parallel with the sixth resistor. The connection point between the seventh capacitor and the seventh resistor is connected to the base electrode of the second output transistor. Each of the elements of the second RC network have different values from the corresponding elements of the first RC network. A second load is connected to at least one of the collector and emitter electrodes of the second output transistor and a second parallel circuit, including an eighth capacitor and an eighth resistor, is connected between the base electrode of the second output transistor and the circuit ground.

In the preferred embodiment at least the input transistor and the first and second output transistors are formed on the same semiconductor substrate as an IC chip. The resistance values of the fifth, sixth and seventh resistors and the capacitance values of the fifth, sixth and seventh capacitors are selected to be approximately twice those of the first, second and third resistors and those of the first, second and third capacitors, respectively.

In other preferred embodiments the first and second RC networks are expanded to include a first capacitor group of $n$ number of capacitors (where $n$ is positive integer greater than 3) connected in series between the first terminal and a first output terminal, a second capacitor group of $n$-1 number of capacitors connected in series between the second terminal and a second output terminal, and a plurality of resistor groups, each group being connected between the connection points of the adjacent pairs of capacitors of the first and second capacitor groups.

It is therefore a primary object of the invention to provide an improved all-pass phase-shift circuit.

It is a further object of the invention to provide an all-pass phase-shift circuit in which the phase of an input signal is varied linearly over a wide frequency range.

It is a further object of the invention to provide an all-pass phase-shift circuit which has the characteristic that the phase of an input signal is linearly varied over a wide frequency range with a linear gain characteristic.

It is a yet further object of the invention to provide an all-pass phase-shift circuit suitable for manufacture as an IC chip.

It is a still further object of the invention to provide an all-pass phase-shift circuit suitable when it is adapted for use in a four-channel stereo encoding and-/or reproducing apparatus.

The foregoing and other objectives, features and advantages of the invention will be more readily understood upon consideration of the following detailed description of certain preferred embodiments of the invention, taken in conjunction with the accompanying drawings.

DESCRIPTION OF THE PREFERRED EMBODIMENTS

Figure 1:
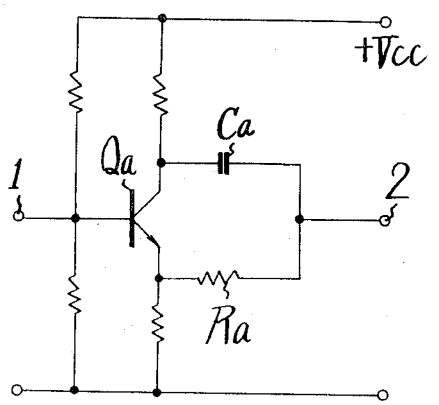
FIGS. 1 and 2 are schematic diagrams illustrating typical phase-shift circuits of the prior art.
Figure 2:
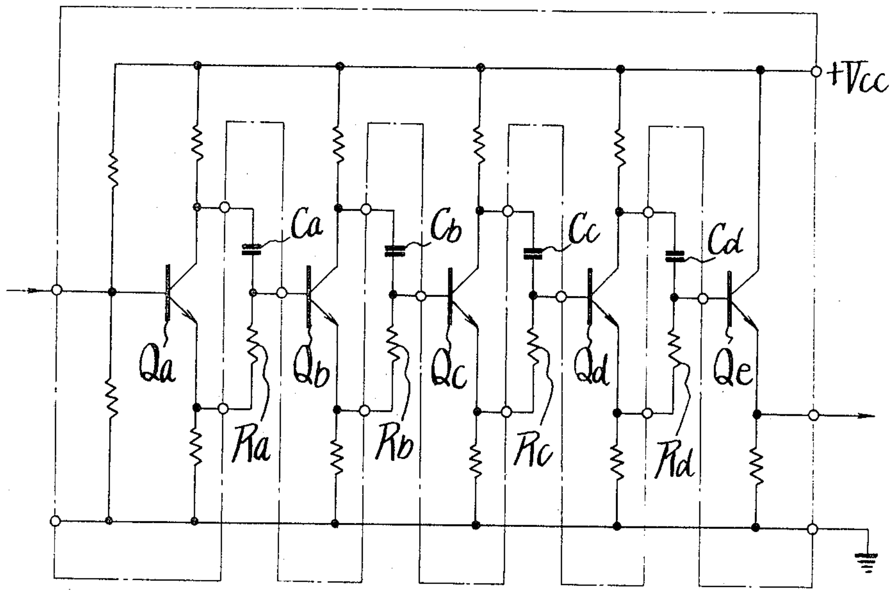
Figure 3:
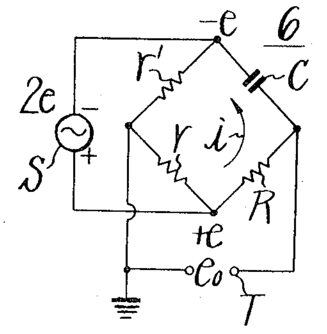
FIG. 3 is a schematic diagram used for explaining the operation of the invention.

The theory of an all-pass phase-shift circuit according to the invention will first be described. As shown in FIG. 3, if a bridge circuit 6 is composed of resistors R, $r$, $r'$ and a capacitor $c$ and an alternating current (AC) voltage $2e$ (an angular frequency of which is taken as $\omega$) is applied to one diagonal of the bridge circuit 6, namely across the connection points between the capacitor $c$ and resistor $r'$ and between the resistors R and $r$ with the former connection point supplied with $-e$ and with the latter connection point supplied with $+e$, by way of example, current $i$ flowing through the resistor R and the capacitor $c$ in series is expressed as follows:

$$i = j2\omega C/1 + j\omega CR\ e$$

where $C$ represents the capacity of the capacitor $c$ and R the resistance of the resistor $R$.

Accordingly, an output $e_O$ obtained across the other diagonal (output terminal) $T$ of the bridge circuit 6 is expressed as follows:

$$e_0 = e - iR$$

$$= e\ (1 - j\omega CR/1 + j\omega CR)$$

If the condition, $\omega_c = 1/CR$, is satisfied, the transfer function $G_6\ (j\omega)$ of the bridge circuit 6 is expressed as follows:

$$G_6\ (j\omega) = 1 - j\ (\omega/\omega_c)/1 + j\ (\omega/\omega_c)$$

Consequently, the gain $A_6$ and phase $\phi_6$ of the bridge circuit 6 are expressed as follows:

$$A_6 = 1$$

$$\phi_6 = -2\tan^{-1}(\omega/\omega_c)$$

Figure 4:
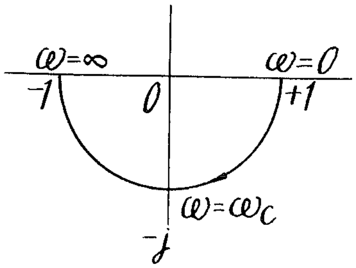
FIG. 4 is a graph in which the transfer function of the circuit shown in FIG. 3 is illustrated as a vector locus.

If the transfer function $G_6\ (j\omega)$ of the circuit shown in FIG. 3 is illustrated, the vector locus of FIG. 4 is obtained. As is apparent from the graph of FIG. 4, the vector locus of the transfer function $G_6$ ($j\omega$) is a semicircle positioned in the second and third quadrants of the coordinate with the original or zero point 0 of the graph as its center and having a unit radius. In this case, the vector locus starts from the positive abscissa and terminates at the negative abscissa through the negative ordinate in the clock-wise direction as shown in FIG. 4. In other words, if The angular frequency $\omega$ is varied from zero ($\omega = 0$) to infinity ($\omega = \infty$), the gain $A_1$ is 1 with no variation but the phase $\phi_6$ varies from zero to $-\pi$.

Figure 5:
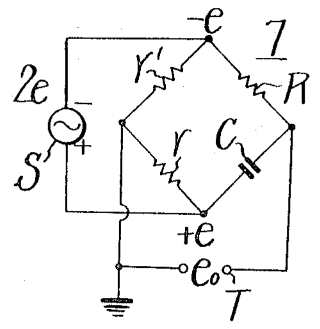
FIG. 5 is a second circuit diagram for use in explaining the operation of the invention.

FIG. 5 shows another circuit diagram in which a bridge circuit 7 is formed by interchanging the capacitor $c$ and the resistor R in the bridge circuit 6 shown in FIG. 3. The transfer function $G_7$ ($j\omega$) of the bridge circuit 7 is expressed as follows:

$$G_7 (j\omega) = - 1 - j (\omega/\omega_c)/1 + j (\omega/\omega_c)$$
$$= - G_6 (j\omega)$$

Figure 6:
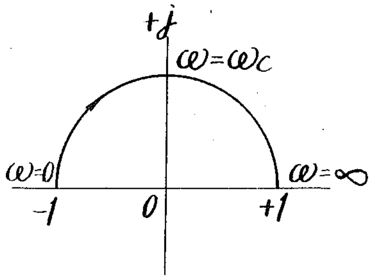
FIG. 6 is a graph in which the transfer function of the circuit shown in FIG. 5 is illustrated as a vector locus.

Accordingly, the vector locus of the transfer function $G_7$ can be illustrated as in FIG. 6 in which the vector locus is a semicircle positioned in the fourth and first quadrants of the coordinate with the zero point 0 of the graph as its center and having a unit radius. In this case, the vector starts from the negative abscissa and terminates at the positive abcissa through the positive ordinate in the clockwise direction shown by the arrow in FIG. 6. In other words, when the angular frequency $\omega$ varies from zero to infinity, the gain $A_7$ is 1 with no variation but the phase $\phi_7$ changes from $-\pi$ to $-2\pi\pi$ .

Accordingly, it may be anticipated that if the bridge circuits 6 and 7 shown in FIGS. 3 and 5 are connected in two-stages free from interference therebetween, the phase of the combined circuit can be varied from 0 to $-2\pi$ through $-\pi$ when the angular frequency $\omega$ varies from 0 to $\infty$ by suitably selecting the capacitors and resistors.

Figure 7:
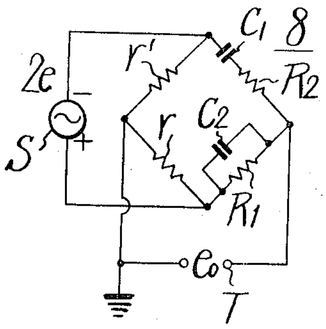
FIG. 7 is a third circuit diagram for use in explaining the operation of the invention.

FIG. 7 shows a bridge circuit 8 which includes a series connection of a capacitor $c_1$ and a resistor $R_2$, a parallel connection of a capacitor $c_2$ and a resistor $R_1$ and two resistors $r$, $r'$ as connected in the figure. The transfer function $G_8$ ($j\omega$) of the bridge circuit 8 is expressed by the similar calculation as follows:

$$G_8 (j\omega) = (2/_K - 1) + j (\omega/\omega_{c_{\bar{2}}} - \omega_{c_{\bar{1}}}/\omega)/(2/_K + 1) + j (\omega/\omega_{c_{\bar{2}}} - \omega_{c_{\bar{1}}}/\omega)$$

where $c_1$ and $c_2$ represent the capacities of the capacitors $C_1$ and $C_2$ and the conditions $R_2/R_1 = C_2/C_1 = 1/\sqrt{K}$, $\omega_{c_{\bar{1}}} = 1/C_1R_1$ and $\omega_{c_{\bar{2}}} = 1/C_2R_2$ are satisfied, respectively. In this case, $R_1$ and $R_2$ represent the resistances of the resistors $R_1$ and $R_2$.

Figure 8:
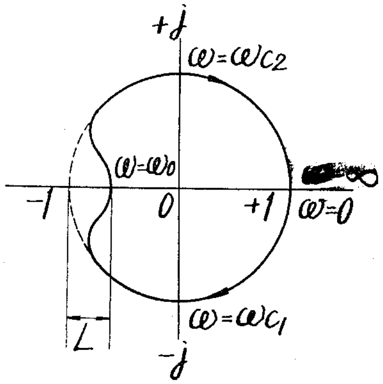
FIG. 8 is a graph in which the transfer function of the circuit shown in FIG. 7 is illustrated as a vector locus.
Figures 9A, 9B:
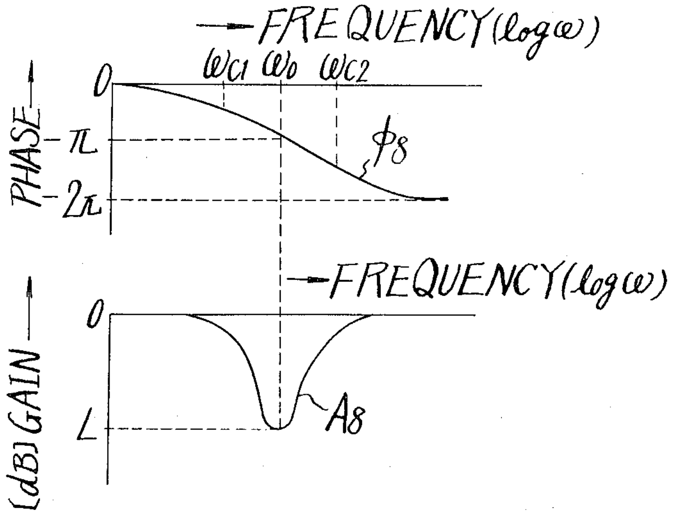
FIGS. 9A and 9B are respectively graphs which show the phase-shift and gain characteristics of the circuit shown in FIG. 7.
Figure 10:
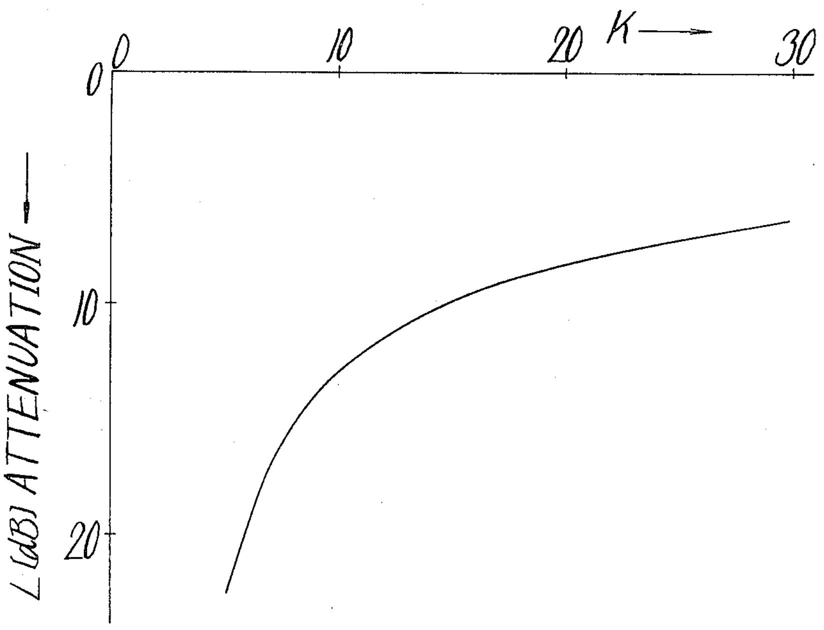
FIG. 10 is a graph in which the relation between an attenuation and a constant (K) of the circuit shown in FIG. 7 is illustrated.

Accordingly, the vector locus of the transfer function $G_8$ ($j\omega$) can be illustrated in FIG. 8. As is apparent from FIG. 8, the vector circulates about the original point 0 of the coordinate as a circle with a unit radius when the angular frequency $\omega$ varies from 0 to $\infty$ in the clockwise direction shown by the arrow in the figure. In this case, however, at the angular frequency $\omega_0 = \sqrt{\omega_{c_1} \cdot \omega_{c_2}}$ where the complex number component becomes zero, the phase $\phi_8$ becomes $-\pi$ and a resonance is generated at the angular frequency $\omega_0$ to attentuate the gain $A_8$ by $L = (2 - \sqrt{K})/(2 + \sqrt{K})$ as shown in the figure. The characteristics of the phase $\phi_8$ and the gain $A_8$ for the angular frequency $\omega$ are shown in FIGS. 9A and 9B, respectively and the relation between $K$ and $L$ (attenuation value) is shown in FIG. 10. As is apparent from FIG. 10, as $K$ becomes great, the attenuation amount $L$ becomes small.

Figure 11:
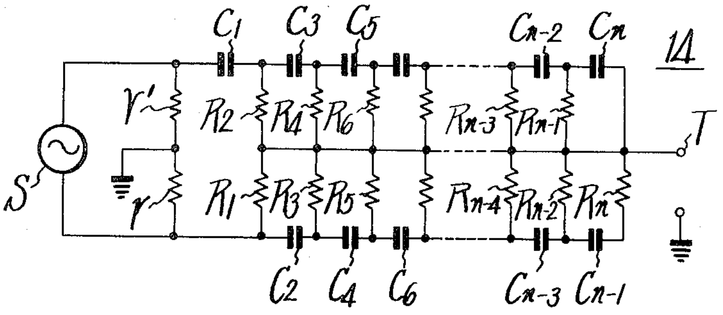
FIG. 11 is a schematic diagram of a first embodiment of an all-pass phase-shift circuit according to the invention.
Figure 12:
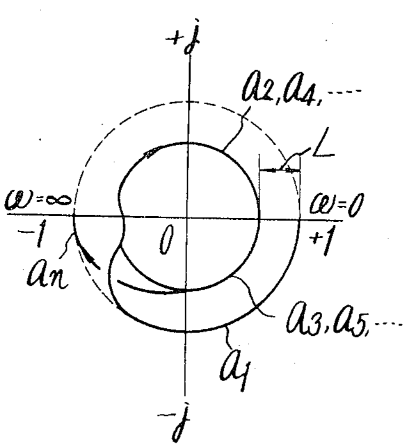
FIG. 12 is a graph which illustrates the vector locus of the transfer function of the circuit shown in FIG. 11.
Figures 13A, 13B:
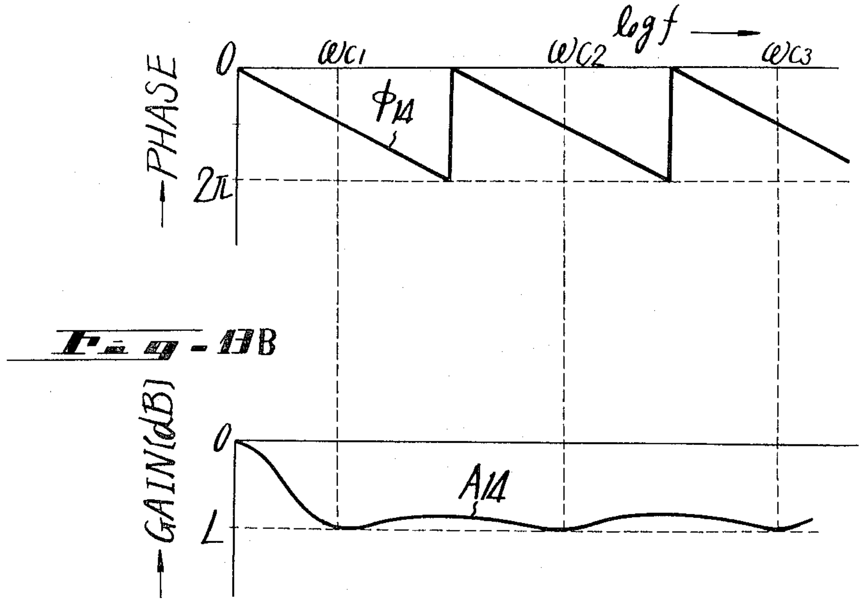
FIGS. 13A and 13B are respectively graphs which illustrate the phase-shift and gain characteristics of the circuit shown in FIG. 11.

Referring now more particularly to FIG. 11 a first embodiment of the invention is illustrated in which a bridge circuit 14 includes n capacitors $c_1$ to $c_n$ and $n$ resistors $R_1$ to $R_n$ (where $n$ represents an off number greater than 3). The vector locus of the transfer function of the bridge circuit 14 is shown in FIG. 12, the calculation therefore being omitted. The vector locus changes from a curve $a_1$ to a curve $a_n$ through curves $a_2, a_4, \ldots$ when the angular frequency $\omega$ changes from 0 to $\infty$, while the phase $\phi_{14}$ of the bridge circuit 14 changes between 0 and $-2\pi$ in a saw-tooth wave as shown in FIG. 13A and the gain $A_8$ of the bridge circuit 14 attentuates at resonance points due to the capacitors $c_1$ to $c_n$ and the resistors $R_1$ to $R_n$, respectively, while attenuates substantially constants at midregion therebetween as shown in FIG. 13B. In FIG. 11 reference character T designates an output terminal.

Figure 14:
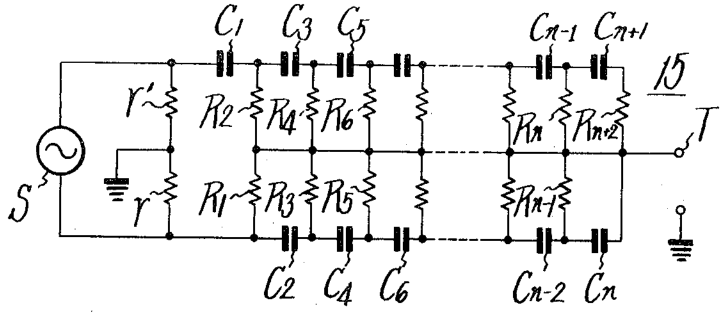
FIG. 14 is a schematic diagram of a second embodiment of an all-pass phase-shift circuit according to the invention.
Figure 15:
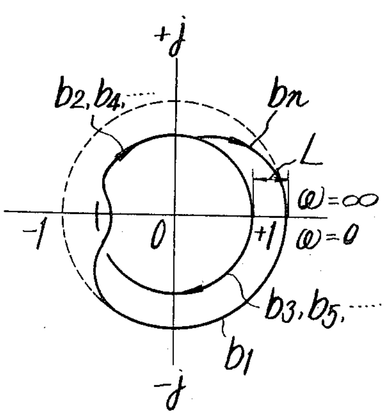
FIG. 15 is a graph which illustrates the vector locus of the transfer function of the circuit shown in FIG. 14.

FIG. 14 shows a further circuit in which a bridge circuit 15 includes $n$ capacitors $c_1$ to $c_n$ resistors $R_1$ to $R_n$ (where $n$ is an even number greater than 4). The vector locus of the transfer function of the bridge circuit 15 is shown in FIG. 15. As is apparent from the figure, the locus changes from a curve $b_1$ to a curve $b_n$ through curves $b_2, b_3, \ldots$, as the angular frequency $\omega$ varies from 0 to $\infty$. In FIG. 14 reference character T designates an output terminal.

An all-pass phase-shift circuit according to the invention adapts the theorem mentioned above to give a predetermined phase difference between, for example, two signals.

The bridge circuit 8 shown in FIG. 7 corresponds to the case where the number $n$ is selected to be 2 ($n = 2$) in that described in connection with FIG. 11 or 14. With the bridge circuit 8, its phase $\phi_8$ is in substantially linear proportion to the logarithm of the angular frequency $\omega$ but its linear portion is short as is apparent from FIG. 9A. Its gain $A_8$ has a trough at the position corresponding to the angular frequency $\omega_0$ as shown in FIG. 9B. In this case, the inclination or gradient of the left and right hand inclined portions thereof are not 6 dB/oct but changes in accordance with the frequency, so that the bridge circuit 8 is not suited for a phase-shift circuit. If, however, the condition $n \geqq 3$ is satisfied in the bridge circuit 14 or 15 of FIG. 11 or 14, the phase $\phi_{14}$, by way of example, changes in substantially linear proportion to the logarithm of the angular frequency though in saw-tooth form and its linear portion is long as compared with the curve $\omega_8$ as is apparent from FIG. 13A. The gain $A_{14}$ attenuates in mid-portion as is shown in FIG. 13B but the inclination or gradient of the characteristic curve at low and high range thereof becomes 6 dB/oct due to the fact that the attenuation is composed of attenuations caused by resonances of the capacitors $c_1$ to $c_n$ and the resistors $R_1$ to $R_n$. Accordingly, the inclination or gradient can be compensated for by a circuit simple in construction to make the gain $A_{14}$ have a flat characteristic.

In view of this, according to the invention a bridge circuit is formed with the condition that $n$ is selected equal to or greater than 3, namely $n \geqq 3$ and a compensation circuit simple in construction is connected to the output terminal of the bridge circuit to make an all-pass phase-shift circuit.

Figure 16:
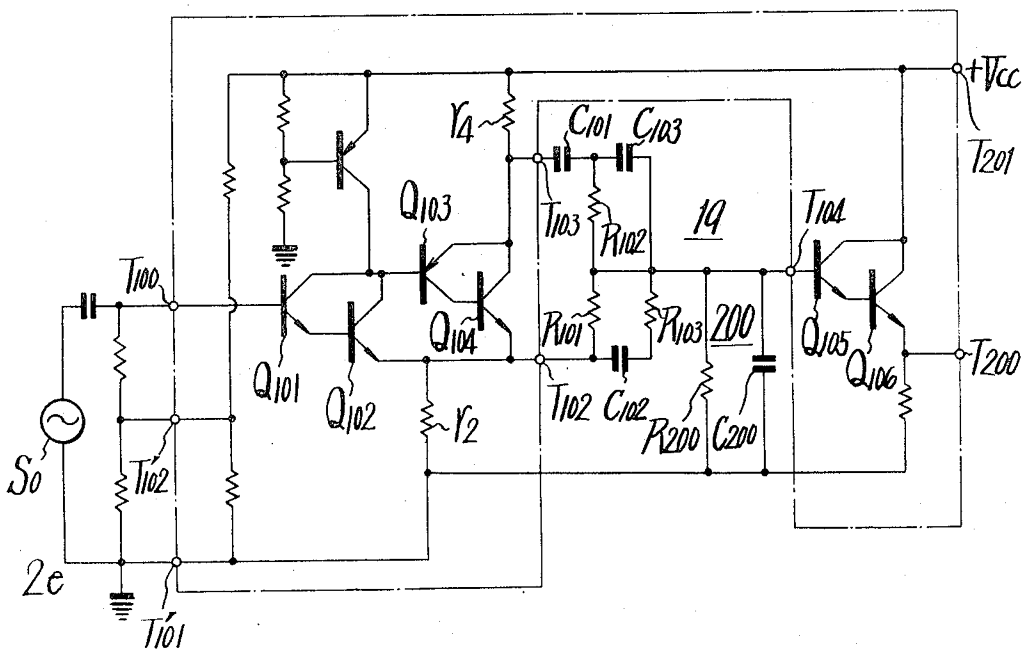
FIG. 16 is a schematic diagram showing a third example of an all-pass phase-shift circuit according to the invention.

FIG. 16 shows an example of an all-pass phase-shift circuit of the invention in which transistors $Q_{101}$ and $Q_{102}$ are connected with each other in Darlington connection manner. A signal to be phase-shifted is applied from a signal source $S_0$ (with voltage $2e$) to an input terminal $T_{101}$ to the circuit ground and through an input terminal $T_{100}$ to the base electrode of the transistor $Q_{101}$. An output obtained at the emitter electrode of the transistor $Q_{102}$ is delivered to a terminal $T_{102}$ while an output obtained at the collector electrode of the transistor $Q_{102}$ is applied to the base electrode of a transistor $Q_{103}$ which is connected to a transistor $Q_{104}$ in an inverse Darlington connection manner. An output obtained at the collector electrode of the transistor $Q_{104}$ is delivered to a terminal $T_{103}$.

In this embodiment, the input impedance of the all-pass phase-shift circuit is increased by the transistors $Q_{101}$ and $Q_{102}$ and the signal from the signal source $S_0$ is delivered to the terminals $T_{102}$ and $T_{103}$ with reverse phases, respectively, by the transistors $Q_{101}$, $Q_{102}$ and $Q_{103}$, $Q_{104}$ in balanced condition. In other words, voltage of $2e$ is impressed across the terminals $T_{102}$ and $T_{103}$. Further, a resistor $r_2$ in series between the emitter electrode of the transistor $Q_{102}$ and the terminal $T_{102}$ and a resistor $r_4$ in series between the collector electrode of the transistor $Q_{104}$ and a bias source $V_{cc}$ correspond to the resistors $r$ and $r$ of the bridge circuits 14 and 15 mentioned above, respectively.

In the example of FIG. 16, there is formed a bridge circuit 19 of three stages with the resistors $r_2$ and $r_4$ as its arms, respectively. A capacitor $C_{101}$ and resistors $R_{102}$ and $R_{101}$ are connected in series between the terminals $T_{103}$ and $T_{102}$ and a capacitor $C_{103}$ is connected in parallel with the resistor $R_{102}$. A series connection of a resistor $R_{103}$ and a capacitor $C_{102}$ is connected in parallel with the resistor $R_{101}$. The connection points between the resistors $R_{102}$ and $R_{101}$ and between the resistor $R_{103}$ and the capacitor $C_{103}$ are together connected to a terminal $T_{104}$. A gain compensation circuit 200 consisting of a parallel circuit of a capacitor $C_{200}$ and a resistor $R_{200}$ is inserted between the terminal $T_{104}$ and the circuit ground.

The terminal $T_{104}$ corresponds to the output terminal T of the above bridge circuits 14 and 15 shown in FIGS. 11 and 14 and is connected to a Darlington connection of transistors $Q_{105}$ and $Q_{106}$. A phase-shifted signal delivered from the bridge circuit 19 is received by the Darlington connection of the transistors $Q_{105}$ and $Q_{106}$ with high impedance and then converted into low impedance to be delivered to an output terminal $T_{200}$.

In this case, the resistance values of the resistors $R_{101}$, $R_{102}$ and $R_{103}$ of the bridge circuit 19, the capacitance value of the capacitors $C_{101}$, $C_{102}$ and $C_{103}$ of the bridge circuit 19 and the time constants $T_1$, $T_2$ and $T_3$ determined by the capacitors $C_{101}$, $C_{102}$, $C_{103}$ and the resistors $R_{101}$, $R_{102}$, $R_{103}$ are respectively selected, by way of example, as follows:

$$T_1 = 20T_2 = 400\ T_3$$

$$R_{102}/R_{101} = R_{103}/R_{R102} = 1/\ \sqrt{K} = 1/20$$

$$C_{102}/C_{101} = C_{103}/C_{102} = 1/\ \sqrt{K} = 1/20$$

Figure 17:
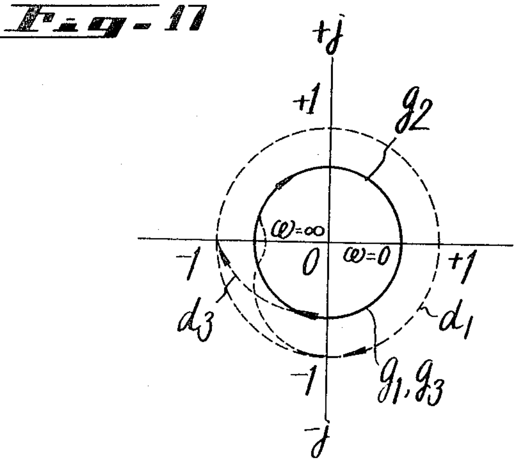
FIG. 17 is a graph for illustrating the vector locus of the transfer function of the circuit shown in FIG. 16.

The theoretical analysis of the all-pass phase-shift circuit constructed as described above can be carried out in the same manner so that the analysis is omitted but the vector locus of the transfer function of the all-pass phase-shift circuit is shown in FIG. 17. As is apparent from FIG. 17, in the case where only the bridge circuit 19 is provided and the compensation circuit 200 is not connected thereto, the vector locus varies from a curve $d_1$ to a curve $d_3$ through a curve $g_2$ as the angular frequency $\omega$ varies from 0 to $\infty$ as in the case of FIG. 12 to change its gain. However, in the case that the compensation circuit 200 is connected as shown in FIG. 16, the vector locus changes from the curve $d_1$ to a curve $g_1$ for a low (frequency) band of an input signal with attenuation due to the resistor $R_{200}$ and changes from the curve $d_3$ to a curve $g_3$ for a high frequency band of the input signal with attenuation due to the capacitor $C_{200}$. Accordingly, the vector locus of the all-pass phase-shift circuit of FIG. 16 changes from the curves $g_1$ to $g_3$ through the curve $g_2$ as the angular frequency $\omega$ changes from 0 to $\infty$ and the phase changes from 0 to $-3\pi$ $(-\pi)$ through $-2\pi$ (0) while the gain attenuates constantly.

Figure 18:
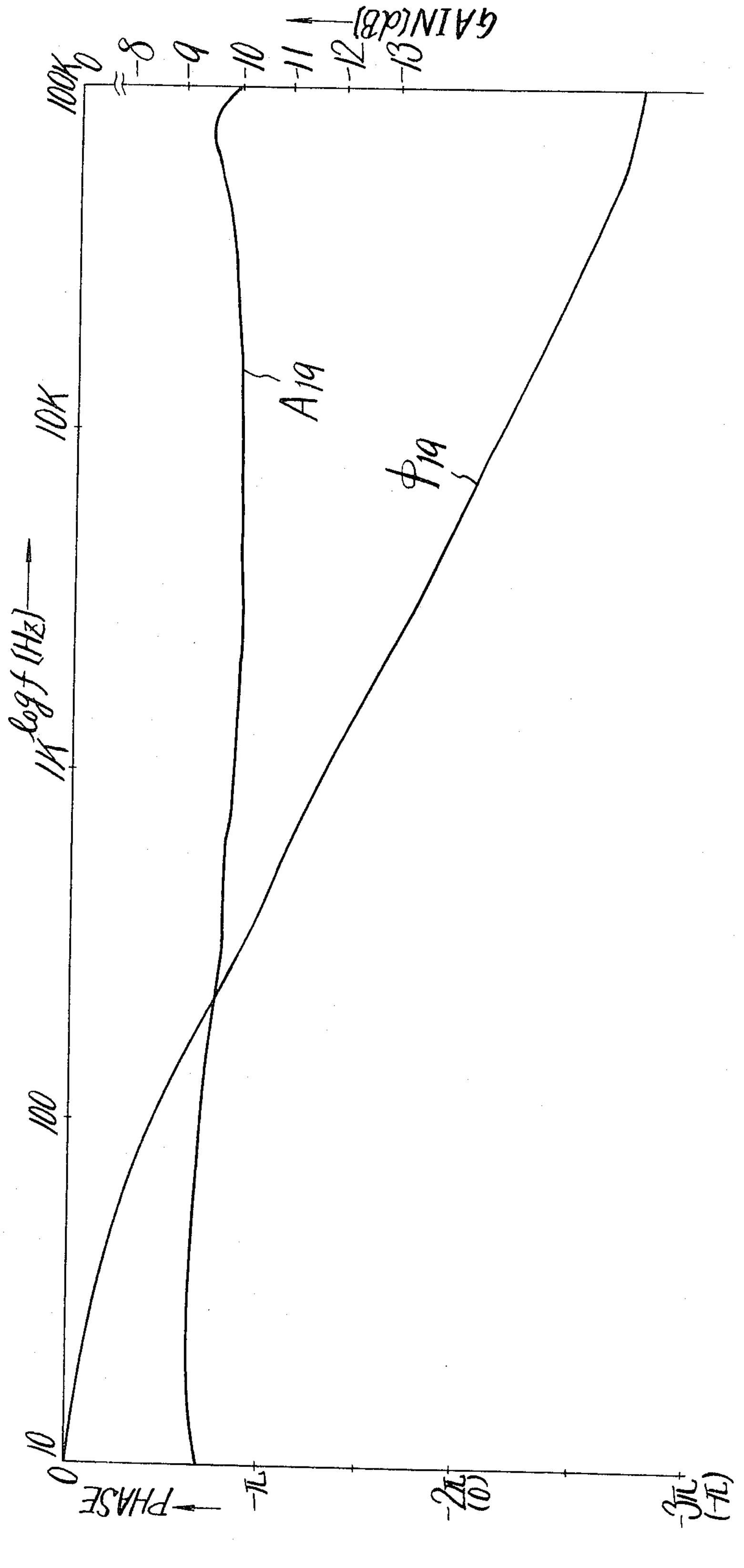
FIG. 18 is a graph which illustrates the phase-shift and gain characteristics of the circuit shown in FIG. 16.

FIG. 18 is a graph which shows the measuring results of the phase characteristic $\phi_{19}$ and the gain characteristic $A_{19}$ of the all-pass phase-shift circuit shown in FIG. 16. In this case, K is selected to be about 23. In FIG. 18, for a better understanding of the linearlity of the phase characteristic $\phi_{19}$, the scale of the ordinate is taken as $0 \approx -2\pi\ (0) \approx -3\pi\ (-\pi\ )$.

As is apparent from the measured results shown in FIG. 18, the gain characteristic $A_{19}$ of the all-pass phase-shift circuit of the invention is substantially flat though with some attenuation and the phase characteristic $\phi_{10}$ is long in its linear portion. Although the phase characteristic $\phi_{19}$ has a saw-tooth form between 0 and $-2\pi$, a constant phase difference can be obtained between two signals. Accordingly, the phase characteristic could be taken as the equivalent of a linear one.

In one embodiment the portion of the all-pass phase-shift circuit shown in FIG. 16 as surrounded by a dot-dash line is integrated on a single semiconductor substrate. In this case, only three external terminals are required for connecting the phase-shift resistors $R_{101}$ and $R_{102}$, the capacitors $C_{101}$ and $C_{103}$ and the compensation circuit 200 are only three, namely the terminals $T_{102}$, $T_{103}$ and $T_{104}$ and the other terminals for forming the phase-shift circuit are the input terminal $T_{100}$, the output terminal $T_{200}$, a power source terminal $T_{201}$, a common or circuit ground terminal $T'_{101}$ and a bias terminal $T'_{102}$. Therefore, the all-pass phase-shift circuit of the invention can be easily made as an IC chip due to the fact that only eight external terminals are necessary.

Figure 19:
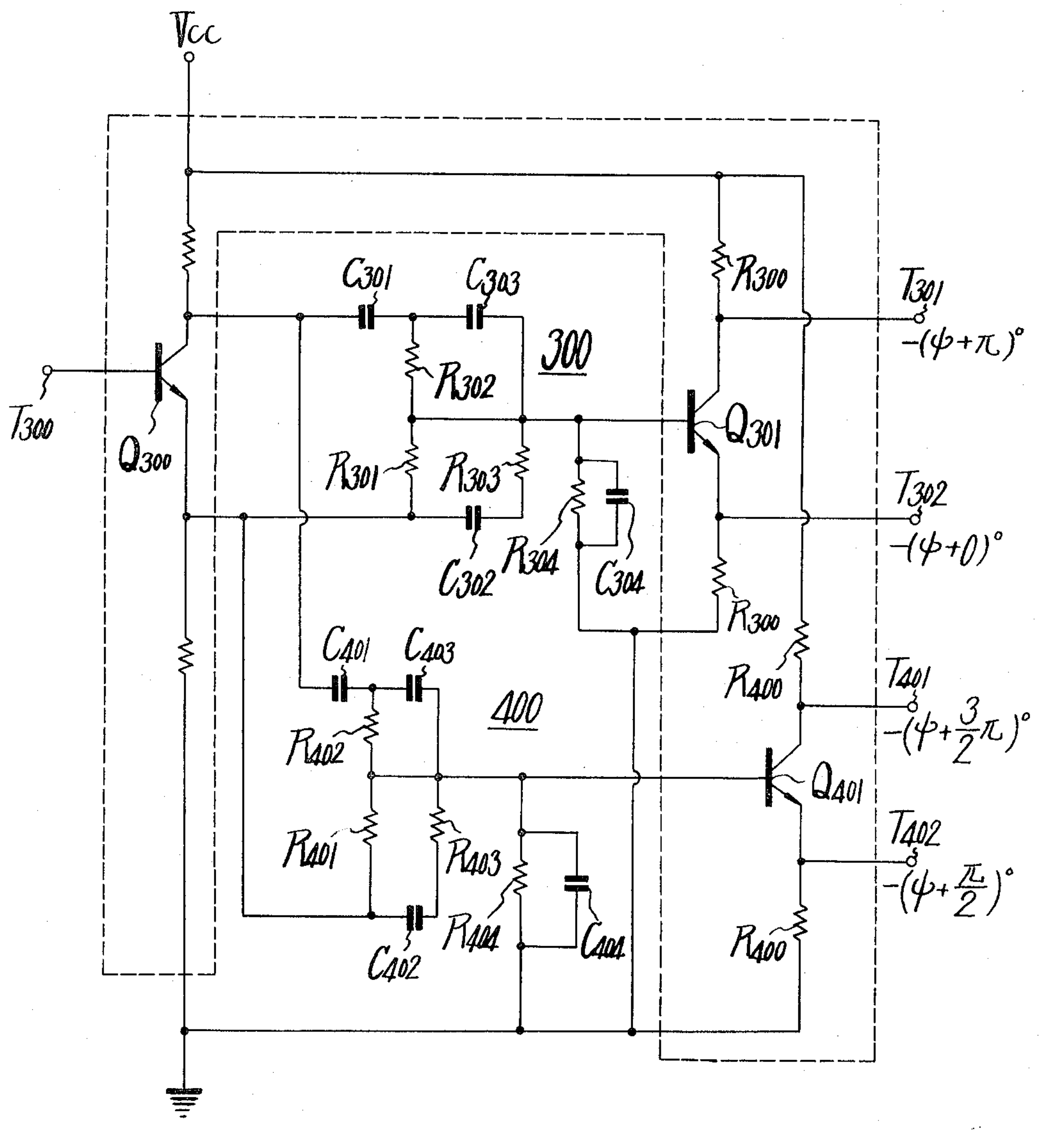
FIGS. 19, 20 and 21 are respectively schematic diagrams for illustrating other examples of the invention.

FIG. 19 shows another example of the invention which is further improved over that shown in FIG. 16. In the example of FIG. 19, a transistor $Q_{300}$ is provided which has connected thereto an input terminal $T_{300}$ at its base electrode. A series connection of a capacitor $C_{301}$ and resistors $R_{302}$ and $R_{301}$ is connected between the collector and emitter electrodes of the transistor $Q_{300}$, while a capacitor $C_{303}$ is connected in parallel with the resistor $R_{302}$. A series connection of a resistor $R_{303}$ and a capacitor $C_{302}$ is connected in parallel with the resistor $R_{301}$. The connection points between the resistors $R_{302}$ and $R_{301}$ and between the resistor $R_{303}$ and the capacitor $C_{303}$ are together connected to the base electrode of a transistor $Q_{301}$. Thus, a first RC network 300 is composed.

Further, a series connection of a capacitor $C_{401}$ and resistors $R_{402}$ and $R_{401}$ is connected between the collector and emitter electrodes of the transistor $Q_{300}$. A capacitor $C_{403}$ is connected in parallel with the resistor $R_{402}$ while a series connection of a resistor $R_{403}$ and a capacitor $C_{402}$ is connected in parallel with the resistor $R_{401}$. The connection points between the resistors $R_{402}$ and $R_{401}$ and between the capacitor $C_{403}$ and the resistor $R_{403}$ are together connected to the base electrode of a transistor $Q_{401}$. Thus, a second RC network 400 is constructed which is connected in parallel with the first RC network 300. In this case, the transistors $Q_{301}$ and $Q_{401}$ operate as buffers for the first and second RC networks 300 and 400 and also as phase-shifters, respectively.

A parallel connection of a resistor $R_{304}$ and a capacitor $C_{304}$ is connected between the base electrode of the transistor $Q_{301}$ and the circuit ground for gain compensation, while a parallel connection of a resistor $R_{404}$ and a capacitor $C_{404}$ is similarly connected between the base electrode of the transistor $Q_{401}$ and the circuit ground for gain compensation. Therefore, it may be considered that these parallel connections are parts of the first and second RC networks 300 and 400, respectively. Resistors $R_{300}$ and $R_{400}$ with the same resistance value are connected to the emitter and collector electrodes of the transistors $Q_{301}$ and $Q_{401}$, respectively, and output terminals $T_{301}$, $T_{302}$, $T_{401}$ and $T_{402}$ are led out from the collector and emitter electrodes of the transistors $Q_{301}$ and $Q_{401}$, respectively. In this case, it is assumed that the resistance and capacitance values of the elements forming the second RC network 400 are selected to have twice the values of the corresponding elements of the first RC network 300.

If the embodiment shown in FIG. 19 is made as an IC chip, the part surrounded by the dotted line block in the figure is formed on a semiconductor substrate, that is, the transistors $Q_{300}$, $Q_{301}$ and $Q_{401}$ and their bias resistors $R_{300}$, $R_{300}$, $R_{400}$, $R_{400}$ are integrated on the same semiconductor substrate.

In the example shown in FIG. 19, from the output terminals $T_{301}$, $T_{302}$, $T_{401}$ and $T_{402}$ there are derived signals phase-shifted by $-(\psi+\pi)$, $-(\psi+0)$, $-(\psi+3/2\,\pi)$ and $-(\psi+\pi/2)$, respectively. Accordingly, if the output terminals $T_{302}$ and $T_{402}$ are actually used, two signals different in phase by 90° are obtained therefrom with respect to an input signal applied to the input terminal $T_{300}$. Further, it will be apparent that if all the output terminals are used, differently phase-shifted signals are obtained therefrom, respectively.

Figure 20:
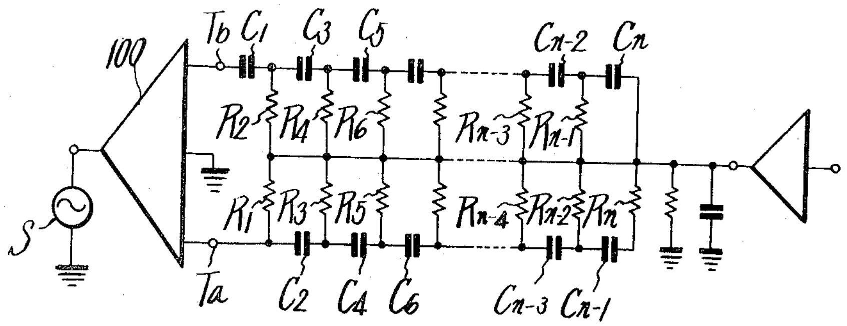
Figure 21:
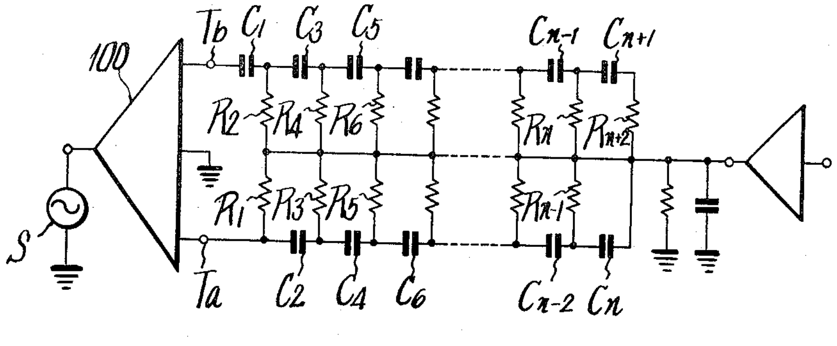

FIGS. 20 and 21 show two other embodiments of the invention. The embodiment shown in FIG. 20 corresponds to the case where an odd number stage of a bridge circuit (where *n* is an odd number) is employed, while that shown in FIG. 21 corresponds to the case where an even number stage of a bridge circuit (where *n* is an even number) is employed.

In these cases, it is assumed that the resistance values of the resistors *Ri*, the capacity values of the capacitors *Ci* and the time constants *Ti* determined by the capacitors *Ci* and the resistors *Ri* where *n* is a value of 1 to *n* have the following relationships:

$$T_1 = K'T_2 = K^2T_2 = K^3T_4 = \ldots\ldots = K^{n-1}T_n$$

$$\frac{R_2}{R_1} = \frac{R_3}{R_2} = \frac{R_4}{R_3} = \ldots\ldots = \frac{R_n}{R_{n-1}} = \frac{1}{\sqrt{K}}$$

$$\frac{C_2}{C_1} = \frac{C_3}{C_2} = \frac{C_4}{C_3} = \ldots\ldots = \frac{C_n}{C_{n-1}} = \frac{1}{\sqrt{K}}$$

If *n* is constant, as *K* becomes small the resonance frequencies due to the capacitors $C_1$ to $C_n$ and the resistors $R_1$ to $R_n$ become close to one another to make a corrugation of an attenuated portion of the gain in the midregion flat, but the flat portion becomes narrow. Accordingly, it is desired in general that the condition $K \approx 20$ is satisfied.

As mentioned above, with the all-pass phase-shift circuit of the invention its gain characteristic is constant and its output changes in phase in substantially linear proportion to the logarithm of the frequency. Further, if the all-pass phase-shift circuit is desired to be made as an IC chip, it requires only a minimum of external terminals even though the resistors and capacitors for the phase-shift are connected thereto from the outside. Accordingly, the circuit can be easily integrated with various advantages as an IC chip. Further, since the number of necessary external terminals does not increase even if the number of resistors and capacitors for phase-shifting are increased in multi-stages, no limitation is given to the number of the resistors and capacitors for phase-shifting. Accordingly, an all-pass phase-shift circuit with the desired characteristics can be provided according to the invention.

In the invention the bridge circuit is driven in low impedance by the transistors while its output is received by the transistors in high impedance, so that the circuit is free from the influence of other circuits to which it is connected.

In the above examples, it may be possible that the resistors and capacitors for phase-shifting are interchanged with one another and the capacitors are replaced with coils. Further, signals to be phase-shifted may be applied to terminals *Ta* and *Tb* by, for example, a differential amplifier 100 as shown in FIGS. 20 and 21.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. An all-pass phase-shift circuit comprising: a common terminal, an input circuit having first, second, and third terminals for supplying phase reversed signals to the second and third terminals corresponding to an input signal applied between the first terminal and the common terminal, a first capacitor and a first resistor connected in series between the second and third terminals, a second resistor connected in series between the first capacitor and the first resistor, a series connection of a third resistor and a second capacitor connected in parallel with the first resistor, a third capacitor connected in parallel with the second resistor, and means for deriving a phase shifted signal from between the junction of the first and second resistors and the common terminal.

2. An all-pass phase-shift circuit comprising: a common terminal, an input circuit having first, second, and third terminals for supplying phase reversed signals to the second and third terminals corresponding to an input signal applied between the first terminal and the common terminal, the input circuit including a transistor having its base, collector and emitter electrodes connected to the first, second and third terminals, respectively, a first capacitor and a first resistor connected in series between the second and third terminals, a second resistor connected in series between the first capacitor and the first resistor, a series connection of a third resistor and a second capacitor connected in parallel with the first resistor, a third capacitor connected in parallel with the second resistor, and means for deriving a phase shifted signal from between the junction of the first and second resistors and the common terminal.

3. An all-pass phase-shift circuit as recited in claim 2 wherein the means for deriving an output signal includes an output transistor having base, collector and emitter electrodes, the base electrode being connected to the connection point between the third capacitor and the third resistor, the output signal being derived between the collector and emitter electrodes of the output transistor, and a parallel circuit of a fourth capacitor and a fourth resistor connected between the base electrode of the output transistor and the common terminal.

4. An all-pass phase-shift circuit as claimed in claim 3 in which at least the input and output transistors are formed on a semiconductor substrate as an IC chip.

5. An all-pass phase-shift circuit comprising:

a. an input transistor having base, collector and emitter electrodes, b. an input circuit connected to the base electrode of the input transistor, c. first and second output transistors each having base, collector and emitter electrodes, d. a common terminal, e. a first RC network connected between the input transistor and the first output transistor and having a first capacitor and a first resistor which are connected in series between the collector and emitter electrodes of the input transistor, a second resistor connected in series between the first capacitor and the first resistor, a series connection of a third resistor and a second capacitor connected in parallel with the first resistor, a third capacitor connected in parallel with the second resistor, the connection point between the third capacitor and the third resistor being connected to the base electrode of the first output transistor, a first output signal being derived from between the common terminal and at least one of the collector and emitter electrodes of the first output transistor, f. a first parallel circuit of a fourth capacitor and a fourth resistor connected between the base electrode of the first output transistor and the common terminal, g. a second RC network connected between the input transistor and the second output transistor and having a fifth capacitor and a fifth resistor connected in series between the collector and emitter electrodes of the input transistor, a sixth resistor connected in series between the fifth capacitor and the fifth resistor, a series connection of a seventh resistor and a sixth capacitor connected in parallel with the fifth resistor, a seventh capacitor connected in parallel with the sixth resistor, the connection point between the seventh capacitor and the seventh resistor being connected to the base electrode of the second output transistor, each element of the second RC network having different values from each corresponding element of the first RC network, a second output signal being derived from between at least one of the collector and emitter electrodes of the second output transistor and the common terminal, and h. a second parallel circuit of an eighth capacitor and an eighth resistor connected between the base electrode of the second output transistor and the common terminal.

6. An all-pass phase-shift circuit as recited in claim 5 in which the input transistor and the first and second output transistors are formed on the same semiconductor substrate as an IC chip.

7. An all-pass phase shift circuit as recited in claim 5 in which the resistance values of the fifth, sixth and seventh resistors and the capacitance values of the fifth, sixth and seventh capacitors are selected to be substantially twice those of the first, second and third resistors and those of the first, second and third capacitors, respectively.

8. An all-pass phase-shift circuit comprising:

a. an input circuit having an input terminal and first and second output terminals and delivering to the first and second output terminals signals representative of a signal applied to the input terminal but which are opposite in phase with respect to each other, b. a first capacitor group of n number of capacitors (where $n$ is a positive integer greater than 3) connected in series with the first capacitor of the first group of capacitors being connected to the first output terminal, c. a second capacitor group of $n$-1 number of capacitors connected in series with the first capacitor of the second group of capacitors being connected to the second output terminal, d. a series circuit of a first and a second resistor connected in series between the connection point of the first and second capacitors of the first capacitor group and the connection point of first and second capacitors of the second capacitor group, e. a plurality of resistor groups, each group being connected between the connection points of the corresponding remaining adjacent pairs of capacitors of the first and second capacitor groups, each of the resistor groups having two resistors connected in series, f. a third resistor connecting the nth capacitor of the first capacitor group to the ($n$-1)th capacitor of the second capacitor group, the g. first connecting means for connecting the connection point between the first and second resistors of each of the resistor groups, the connection point between the first and second resistors, and one end of the third resistor the phase-shifted output signal being derived from between the one end of the third resistor and the common terminal.

* * * * *